United States Patent

[11] 3,615,760

[72] Inventor John C. Williams
Whippany, N.J.

[21] Appl. No. 815,655
[22] Filed Apr. 14, 1969
[45] Patented Oct. 26, 1971
[73] Assignee Bell Telephone Laboratories, Incorporated
Murray Hill, N.J.

[54] CALCIUM OXIDE-ALUMINUM OXIDE-SILICON DIOXIDE CERAMIC SUBSTRATE MATERIAL FOR THIN FILM CIRCUITS
3 Claims, 3 Drawing Figs.

[52] U.S. Cl. .......... 106/39 R, 106/46, 264/61
[51] Int. Cl. .......... C04b 33/00
[50] Field of Search .......... 106/39, 46, 65; 252/63.5; 264/61, 56; 117/212; 317/258

[56] References Cited

UNITED STATES PATENTS

| | | | |
|---|---|---|---|
| 2,966,719 | 1/1961 | Park | 106/39 X |
| 2,972,570 | 2/1961 | Haas et al. | 106/39 X |
| 3,007,804 | 11/1961 | Kreidl et al. | 106/39 |
| 3,376,481 | 4/1968 | Klerer | 317/258 |
| 3,443,311 | 5/1969 | Worobey | 317/258 X |
| 3,469,729 | 9/1969 | Grekila et al. | 106/47 X |

OTHER REFERENCES

Levin, E. M., et al.; Phase Diagrams for Ceramists; Columbus, Ohio, 1964 p. 219 [ QD 501 L4]

Dummer, G. W. A.; Fixed Capacitors; London, 1964 pp. 204–205. [ QC 587 D8]

*Primary Examiner*—James E. Poer
*Assistant Examiner*—W. R. Satterfield
*Attorneys*—R. J. Guenther and Edwin B. Cave

ABSTRACT: A ceramic body, having the nominal composition in percent by weight 31 CaO, 56 $Al_2O_3$ and 13 $SiO_2$, when fired to a dense, fine-grain structure, is useful as a substrate material for thin film resistors and capacitors.

PATENTED OCT 26 1971 3,615,760

INVENTOR
J. C. WILLIAMS
BY George S. Indig
ATTORNEY

CALCIUM OXIDE-ALUMINUM OXIDE-SILICON DIOXIDE CERAMIC SUBSTRATE MATERIAL FOR THIN FILM CIRCUITS

BACKGROUND OF THE INVENTION

1. Field of the Invention

This invention relates to an unglazed polycrystalline ceramic material which is useful as a substrate for thin film components and circuits.

2. Description of the Prior Art

Materials to be used as substrates to support thin film components such as resistors and capacitors desirably are chemically inert, electrically insulating, thermally conducting, and mechanically strong. In addition, it has been observed that when other factors are the same, the components' performance is often improved by increasing the surface smoothness of the supporting substrates. See, for example, Printed and Integrated Circuitry, Schlabach and Rider, McGraw-Hill 1963, at pp. 50, 51 and pp. 331–333.

The importance of surface smoothness may be appreciated by considering that the tantalum layer in a tantalum thin film component may range in thickness from a few hundred to 1,000 or 2,000 angstroms. If the average deviation from flatness of the substrate surface (usually expressed as centerline average or CLA) is 20 microinches, the tantalum layer may well be discontinuous (1 microinch equals 254 angstroms). Even if the tantalum layer is continuous, substantial differences in its thickness may still be disadvantageous as in one form of capacitor fabricating in which the anodized $Ta_2O_5$ layer would break down in service.

Although various polycrystalline ceramic materials such as alumina or modified alkaline earth porcelains are otherwise well suited for use as substrate materials, their surfaces can usually be rendered sufficiently smooth for most critical applications only by costly glazing or polishing steps. Alternatively, low-alkali refractor glass substrates are sometimes used, despite the fact that they are generally considered inferior to the polycrystalline ceramic substrates, and thus often cannot withstand subsequent processing steps, such as thermal compression bonding, soldering or welding of leads to the deposited terminals. The search is continuing for substrate materials upon which thin film components may be reliably formed.

SUMMARY OF THE INVENTION

A polycrystalline ceramic material having the nominal composition in percent by weight 31 calcium oxide (CaO), 56 aluminum oxide ($Al_2O_3$) and 13 silicon dioxide ($SiO_2$), has now been developed whose as-fired surface when previously suitable shaped by any of a number of known methods such as dry pressing, extruding or doctor blading, permits the formation of thin film circuit components thereon which are more reliable than those formed on other as-fired ceramic surfaces. This result has tentatively been attributed to the surface's smooth grains and shallow grain boundaries and accordingly its high degree of surface smoothness.

DETAILED DESCRIPTION

Figure 1:
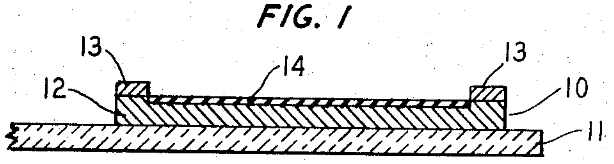
FIG. 1 is a section view of one embodiment of a thin film resistor supported by the inventive material.

The dense, fine-grain fired body of the invention is a polycrystalline ceramic which substantially lacks any glassy phase. It may be obtained from compositions of starting materials within the range expressed as (percent by weight) 28 to 34 calcium oxide (CaO), 54 to 58 aluminum oxide ($Al_2O_3$) and 8 to 18 silicon dioxide $SiO_2$). Beyond these limits for CaO and $Al_2O_3$, and above 18 percent by weight $SiO_2$, the reliability of thin film components supported thereon begins to decrease. In general, reducing the amount of $SiO_2$ increases the component's reliability, although below 8 percent by weight $SiO_2$, the fired body is subject to moisture attack. A composition within the range (percent by weight) 31 CaO, 56 $Al_2O_3$, 13 $SiO_2$ is preferred for optimum reliability of components without loss of chemical stability of the substrate.

The dense, fine-grain fired ceramics of the invention may be produced by methods well known in the art. An exemplary procedure will be briefly described to aid the practitioner, although other techniques may be found which will also result in a satisfactory fired body.

Precautions taken by those skilled in the art concerning the presence of impurities or modifying ingredients in starting materials is sufficient for the practice of the invention. However, impurities present should ordinarily be kept below about 0.1 percent total. For certain critical applications the presence of $Fe_2O_3$ should be kept below 0.01 percent, to avoid deleterious degradation of electrical loss characteristics.

The starting materials as the oxides or other compounds which, with firing, will yield the oxides, such as carbonates, are thoroughly mixed to insure that subsequent reactions take place completely and uniformly. This mixing is usually carried out by forming an aqueous or organic slurry in a ball mill. The material is then dried, granulated, and prereacted by calcining generally at a temperature of from 800° to 1,100° C. for from 2 to 16 hours. The material is then pulverized to break up the agglomerations formed during calcining. At this point various forming aids such as binders, lubricants and plasticizers are added to the material together with an aqueous or organic carrier and a slurry is again formed by ball milling. The particular forming aids selected and the proportion in which they are added depends upon the method chosen for forming the material into bodies having green strength. Dry pressing or doctor blading may be preferred where a flat surface having a mechanically detectable smooth surface profile is desired. In dry pressing, the slurry is dried and powdered, to pass, for example, a 200-mesh screen. It is then poured into dies and pressed at from 3,000 to 60,000 p.s.i.

In doctor-blading, or sheet casting, the slurry is generally formed into a thin sheet of wet ceramic by feeding it onto a carrier which is moving at a constant speed just under a knife blade whose edge is parallel to the surface of the carrier. After air drying, the green sheet is ready for firing. Although not a necessary part of this description, a slurry prepared for forming by doctor-blading is described in U.S. Pat. No. 2,966,719, issued to J. L. Park, Jr. on Jan. 3, 1961.

While the carrier is ordinarily stripped of the doctor-bladed sheet before firing to form a self-supporting ceramic body, formation of a ceramic-coated substrate, by doctor-blading or any other technique, is also contemplated as part of the invention. Other forming methods are contemplated. For example, extrusion may be preferred where rods or tubes having smooth surfaces are desired.

Once formed into a body having green strength, the material is fired at a time and temperature sufficient to result in a dense, fine-grain structure. The requisite firing conditions will depend largely upon the particle sizes of the starting materials, finely divided materials in general being preferred in that they not only require lower temperatures and shorter times than coarser materials to react to a comparably dense fired body, but also lead to a small average grain size in the fired body.

In general, beginning with materials having an average particle size of the order of hundredths of a micron will result in a fired body having about 95 percent of theoretical density and an average grain size of about 2 microns. Materials in this state may be obtained commercially, or produced by coprecipitation from suitable solutions, as is known. Alternatively, coarse particle materials may be conveniently reduced to a finely divided state during mixing, if desired. For example, mixing in a conventional ball mill may be extended to from two to 10 times the usual milling time to reduce particle size. Alternatively, mixing may be carried out in a vibratory mill. Vibratory milling from from 1 to 2 hours will ordinarily result in an appreciable reduction in particle size, for example, from 40 microns to a few tenths of a micron.

Although finely divided materials are preferred, materials having average particle sizes of up to about 40 microns (325-mesh screen) will allow the obtaining of a suitable fired product.

For an average particle size of about 0.01 to 0.10 microns, firing at about 1,300° to 1,400° C. for from 1½to 3 hours will result in a fired body having about 92 to 97 percent of theoretical density and an average grain size of about 1 to 10 microns. To achieve a comparable fired density of starting materials having particle sizes of up to 40 microns, firing at about 1,380° to 1,420° C. for from 2 to 3 hours would be required.

Referring now to FIG. 1, there is shown a section view of a thin film structure comprising a thin film tantalum resistor 10 supported by a substrate of the inventive material 11. The resistor is essentially formed by sputtering a layer of tantalum 12 onto substrate 11, followed by evaporating conductive terminal layers 13 onto substrate 11, followed by oxidizing a portion of the Ta layer 12 to form tantalum oxide $Ta_2O_5$ layer 14, substantially as shown.

Figure 2:
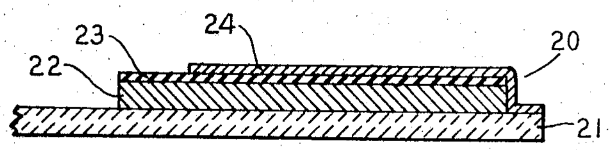
FIG. 2 is a section view of one embodiment of a thin film capacitor supported by the inventive material.

Referring now to FIG. 2, there is shown a section view of a thin film capacitor 20 supported by a substrate of the inventive material 21. The capacitor is essentially formed by sputtering a layer of tantalum 22 onto substrate 21, followed by oxidizing a portion of tantalum layer 22 to form $Ta_2O_5$ layer 23, followed by evaporating metallic counterelectrode 24, substantially as shown.

Figure 3:
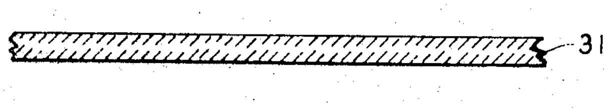
FIG. 3 is a section view of a substrate of the inventive material.

FIG. 3 shows a section of the substrate of the inventive material 31.

EXAMPLE

Chemically pure starting materials having an average particle size of 0.03 microns were combined to give a material having the composition in percent by weight 31 CaO, 56 $Al_2O_3$ and 15 $SiO_2$, and mixed with cellosolve acetate in a ball mill for 16 hours. The resultant slurry filtered, dried, granulated through an 8-mesh screen and calcined to 950° C. at a heating rate of 50° C. per hour. The calcine was pulverized through a 100-mesh screen, and prepared for dry pressing by adding 4 percent (by weight) Carboset 525, (a thermoplastic acrylic resin of B. F. Goodrich Co.) 2 percent oleic acid, and cellosolve acetate, ball milling for 24 hours, drying the resultant slurry and passing it through a 200-mesh screen. Test discs were then dry pressed at 20,000 p.s.i., heated at the rate of about 70° C. per hour to about 1,382° C., fired at about 1,382° C. for 2 hours, and furnace cooled. Firing shrinkage was about 22 percent.

The fired discs were evaluated for forming tantalum thin film resistors on them similar to those of FIG. 1 and comparing their performance with resistors deposited on a modified alkaline earth porcelain.

The percent shift in resistance after oxidation of the tantalum film was observed to be about 37.5 percent in case of the porcelain substrate, but was only about 26.5 percent in the case of the inventive material, indicating improved tantalum layer.

The temperature coefficient of resistance of the finished resistors was observed to be about −138 p.p.m./° C. for the porcelain-supported resistors, but was only about −102 p.p.m./° C. for the inventive substrate, indicating improved resistor performance.

The invention has been described in terms of a limited number of embodiments. Essentially, it teaches the formation of a ceramic body having the ability to support reliable circuit elements. Accordingly, uses other than those described will become apparent to those skilled in the art.

What is claimed is:

1. A fired ceramic body consisting essentially of the composition in percent by weight 28 to 34 of calcium oxide, 54 to 58 of aluminum oxide and 8 to 18 of silicon dioxide, said body consisting of polycrystalline ceramic grains having an average size within the range of from 1 to 10 microns.

2. The fired ceramic body of claim 1 consisting essentially of a composition in percent by weight 30 to 32 calcium oxide, 55 to 57 aluminum oxide and 11 to 15 silicon dioxide, said body consisting of polycrystalline ceramic grains having an average size within the range of from 1 to 2 microns.

3. A method for producing a ceramic body consisting essentially of a composition in percent by weight 28 to 34 of calcium oxide, 54 to 58 of aluminum oxide and 8 to 18 of silicon dioxide, said method comprising a series of processing steps including the intimate mixing of ingredients, said ingredients having grain sizes within the range of 0.01 to 0.10 micron, calcining the mixture at a temperature of from 800° to 1,100° C. for a time of from 2 to 16 hours, forming the mixture into a structurally integrated green body and firing the body at a temperature of from 1,300° to 1,420° C. for a time of from 1½to 3 hours, said ingredients yielding the respective oxides during processing.